United States Patent
Lee et al.

(10) Patent No.: US 10,263,247 B2
(45) Date of Patent: Apr. 16, 2019

(54) NEGATIVE ELECTRODE OF RECHARGEABLE BATTERY AND MANUFACTURING METHOD THEREOF

(71) Applicant: SAMSUNG SDI CO., LTD., Yongin-si, Gyeonggi-do (KR)

(72) Inventors: Jinhyon Lee, Yongin-si (KR); Bokhyun Ka, Yongin-si (KR); Kyeuyoon Sheem, Yongin-si (KR); Soonho Ahn, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 15/833,392

(22) Filed: Dec. 6, 2017

(65) Prior Publication Data

US 2018/0159118 A1 Jun. 7, 2018

(30) Foreign Application Priority Data

Dec. 7, 2016 (KR) .................. 10-2016-0166096

(51) Int. Cl.
  *H01M 4/02* (2006.01)
  *H01M 4/133* (2010.01)
  *H01M 4/1393* (2010.01)
  *H01M 4/04* (2006.01)
  *H01M 4/22* (2006.01)

(52) U.S. Cl.
  CPC ......... *H01M 4/133* (2013.01); *H01M 4/0409* (2013.01); *H01M 4/0435* (2013.01); *H01M 4/1393* (2013.01); *H01M 4/22* (2013.01)

(58) Field of Classification Search
  CPC ....................................................... H01M 4/02
  See application file for complete search history.

(56) References Cited

U.S. PATENT DOCUMENTS

| 2014/0065478 | A1  | 3/2014 | Mitsuhashi et al. |
| 2014/0170487 | A1* | 6/2014 | Takahata ............... H01M 4/133 |
| | | | 429/211 |

FOREIGN PATENT DOCUMENTS

| JP | 5818068    | 10/2015 |
| KR | 10-1556049 | 9/2015  |

* cited by examiner

*Primary Examiner* — Jacob B Marks
(74) *Attorney, Agent, or Firm* — Lee & Morse, P.C.

(57) ABSTRACT

A method for manufacturing a negative electrode of a rechargeable battery includes coating a first active mass on a first surface of a substrate, aligning a first graphite material in the first active mass, and coating a second active mass on a second surface of the substrate. The second active mass includes a second graphite material. The method also includes aligning the second graphite material and pressing the first and second graphite material. The alignment operations are performed by applying magnetic fields, so that a first long axis of the first graphite material forms a first acute angle with the first surface and a second long axis of the second graphite material forms a second acute angle with the second surface. The second long axis is inclined in a direction facing the first long axis, with the substrate therebetween.

20 Claims, 7 Drawing Sheets

Comparative Example        Exemplary Embodiment the second roller may be positioned on the second surface forming the second acute angle.

After the pressing operation, the first long axis may form a third acute angle greater than the first acute angle with the first surface, and the second long axis may form a fourth acute angle greater than the second acute angle with the second surface. The method may include, after the aligning based on the first magnetic field, forming a first roll by winding the substrate and forming a second roll by rewinding the first roll.

In accordance with one or more other embodiments, a negative electrode of a rechargeable battery includes a substrate; a first active mass on a first surface of the substrate and including a first graphite material; and a second active mass on a second surface of the substrate and including a second graphite material, wherein each of the first active mass and the second active mass has a degree of divergence (DD) defined by Equation 1 and wherein a DD of the first active mass is equal to or greater than about 60% of that of the second active mass $$DD=(I_a/I_{total})\times 100 \quad (1)$$

where $I_a$ is a sum of peak intensities at non-planar angles when XRD is measured by using $CuK_\alpha$ rays, and $I_{total}$ is a sum of peak intensities at all angles when XRD is measured by using $CuK_\alpha$ rays.

NEGATIVE ELECTRODE OF RECHARGEABLE BATTERY AND MANUFACTURING METHOD THEREOF

CROSS-REFERENCE TO RELATED APPLICATION

Korean Patent Application No. 10-2016-0166096 filed on Dec. 7, 2016, and entitled, "Negative Electrode of Rechargeable Battery and Manufacturing Method Thereof," is incorporated by reference herein in its entirety.

BACKGROUND

1. Field

One or more embodiments described herein relate to a negative electrode of a rechargeable battery and a method for manufacturing a negative electrode of a rechargeable battery.

2. Description of the Related Art

Rechargeable lithium batteries are used to power many electronic devices. A rechargeable lithium battery uses an organic electrolyte solution and therefore has greater energy density and discharge voltage than batteries that use an aqueous alkaline solution.

The active material for the positive electrode of a rechargeable lithium battery may include an oxide of lithium having a structure which promotes intercalation of lithium ions. Examples include $LiCoO_2$, $LiMn_2O_4$, and $LiNi_{1-x}Co_xO_2$ ($0<x<1$), and a transition metal may be utilized.

The active material for the negative electrode of a lithium rechargeable battery may include various types of carbon-based materials such as artificial graphite, natural graphite, and hard carbon capable of intercalating and deintercalating lithium ions. The negative electrode active material may be coated and rolled. The rolling process may adversely affect the electrochemical characteristics of the rechargeable battery.

SUMMARY

In accordance with one or more embodiments, a method for manufacturing a negative electrode of a rechargeable battery includes coating a first active mass on a first surface of a substrate, the first active mass including a first graphite material; aligning the first graphite material based on a first magnetic field so that a first long axis of the first graphite material forms a first acute angle with the first surface; coating a second active mass on a second surface of the substrate positioned at an opposite side of the first surface, the second active mass including a second graphite material; aligning the second graphite material based on a second magnetic field so that a second long axis of the second graphite material forms a second acute angle with the second surface; and pressing the first graphite and the second graphite using a roller, wherein aligning the second magnetic field includes aligning the second long axis to be inclined in a direction facing the first long axis with the substrate therebetween.

A sum of the first acute angle and the second acute angle may be less than about 180°. The roller may include a first roller positioned on the first surface and a second roller positioned on the second surface, and the method may include rotating the first roller and the second roller in directions facing each other. The first roller may be positioned on the first surface forming the first acute angle, and The first active mass may include an artificial graphite material or a mixture of an artificial graphite material and a natural graphite material. A first long axis of the first graphite material may be at a first acute angle relative to the first surface, and a second long axis of the second graphite material may be at a second acute angle relative to the second surface. A sum of the first acute angle and the second acute angle may be less than about 180°.

In accordance with one or more other embodiments, a negative electrode of a rechargeable battery includes a first active mass; and a second active mass, wherein the first active mass and the second active mass are on different sides of a substrate and wherein the first active mass has a first degree of divergence and the second active mass has a second degree of divergence greater than the first degree of divergence. The degree of divergence of each of the first active mass and the second active mass may be based on Equation 1:

$$DD=(I_a/I_{total})\times 100 \quad (1)$$

where $I_a$ is a sum of peak intensities at non-planar angles when XRD is measured by using $CuK_\alpha$ rays, and $I_{total}$ is a sum of peak intensities at all angles when XRD is measured by using $CuK_\alpha$ rays.

The first degree of divergence may be equal to or greater than about 60% of the second degree of divergence. Graphite materials in the first active mass and the second active mass, respectively, may be aligned under a same condition. A rolled state of the first active mass and a rolled state of the second active mass may have a same shape.

The first active mass may include a first graphite material and the second active mass may include a second graphite material. The first graphite material may be an artificial graphite material or a mixture of artificial graphite material and natural graphite material. A first long axis of the first graphite material may be at a first acute angle relative to a first side of the substrate, and a second long axis of the second graphite material may be at a second acute angle relative to a second side of the substrate.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
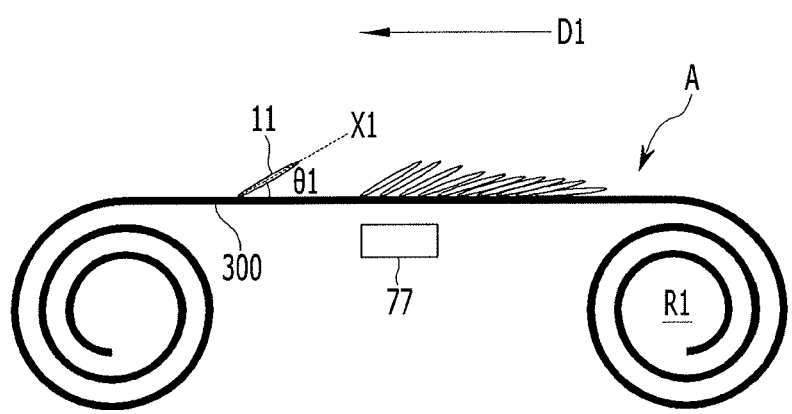
FIGS. 1-4 illustrate stages of an embodiment of a method for manufacturing a negative electrode.

Example embodiments are described with reference to the drawings; however, they may be embodied in different forms and should not be construed as limited to the embodiments set forth herein. Rather, these embodiments are provided so that this disclosure will be thorough and complete, and will convey exemplary implementations to those skilled in the art. The embodiments (or portions thereof) may be combined to form additional embodiments In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

In accordance with an example embodiment, the negative electrode of a lithium rechargeable battery includes an active mass on a substrate with a carbon-based negative electrode active material. The active mass corresponds to a negative electrode having a degree of divergence (DD) (defined by the following Equation 1) that is equal to or greater than about 19.

$$DD=(I_a/I_{total})\times 100 \quad (1)$$

where $I_a$ is a sum of peak intensities at non-planar angles when XRD is measured by using CuK$_\alpha$ rays, and $I_{total}$ is a sum of peak intensities at all angles when XRD is measured by using CuK$_\alpha$ rays.

The non-planar angles may represent 2θ (=42.4±0.2°, 43.4±0.2°, 44.6±0.2°, and 77.5±0.2°) when XRD is measured using CuK$_\alpha$ rays, that is, a (100) plane, a (101) plane R, a (101) plane H, and a (110) plane. Graphite may be classified into a hexagonal structure and a rhombohedral structure having a stacking sequence of an ABAB form according to a stacking order of graphene layers. The R plane may correspond to a rhombohedral structure, and the H plane may correspond to a hexagonal structure.

The all angles mentioned above may represent 2θ (=26.5±0.2°, 42.4±0.2°, 43.4±0.2°, 44.6±0.2°, 54.7±0.2°, and 77.5±0.2°), that is, a (002) plane, a (100) plane, a (101) plane R, a (101) plane H, a (004) plane, and a (110) plane, when XRD is measured using CuK$_\alpha$ rays. The peak at 2θ=43.4±0.2° may be one where a peak corresponding to the (101) R plane of a carbon-based material overlaps a current collector, for example, the (111) plane of Cu. In this case, the peak intensity may be an integral area value.

In an exemplary embodiment, the XRD measurement may be performed through CuK$_\alpha$ rays as target rays, and may be performed, for example, under measurement conditions of 2θ=10° to 80°, a scan speed (°/S) of 0.044 to 0.089, and a step size (°/step) of 0.013 to 0.039.

The DD of the negative electrode may be equal to or greater than about 19, and in one embodiment may be in a range of about 19 to about 60. When the DD of the negative electrode satisfies the aforementioned condition, the negative electrode active material in the negative electrode active material layer may be aligned at a predetermined angle. The value of the DD may be a physical property value that is maintained even when charging and discharging operations are performed.

According to an exemplary embodiment, the negative electrode may include a first active mass and a second active mass respectively positioned at opposite sides of a substrate. The DD value of the second active mass with respect to the DD value of the first active mass, or the DD value of the first active mass with respect to the DD value of the second active mass, may be, for example, equal to or greater than about 60%. When this occurs, the alignment of first active mass may be similar to the alignment of second active mass.

In the exemplary embodiment, the DD may be measured with respect to the negative electrode and may be obtained, for example, by dismantling the lithium rechargeable battery of a fully discharged state after charging and discharging operations. The charging and discharging conditions may be implemented, for example, one time or two times at about 0.1 C to 0.2 C.

When XRD is measured using CuK$_\alpha$ rays, a ratio of the peak intensity of (004) plane to the peak intensity of a (002) plane (e.g., $I_{004}/I_{002}$) may, for example, be equal to or greater than about 0.04 or may be in a range of about 0.04 to about 0.07. When $I_{004}/I_{002}$ of the negative electrode is equal to or greater than about 0.04, DC internal resistance does not increase, but efficiency characteristics (e.g., high efficiency characteristics) may be improved and cycle lifespan characteristics may be improved.

In one embodiment, a BET specific surface area of the negative electrode active material layer may be less than about 5.0 m$^2$/g, or may be in a range of about 0.6 m$^2$/g to about 2.0 m$^2$/g. When the BET specific surface area of the negative electrode active material layer is less than about 5.0 m$^2$/g, electrochemical cycle-life characteristics of a cell may be improved. In one exemplary embodiment, the BET measurement may be performed, for example, by a nitrogen gas adsorption method in a state in which the negative electrode (obtained by dismantling the lithium rechargeable battery of the fully discharged state after charging and discharging the lithium rechargeable battery including the negative electrode) is cut at a predetermined size and introduced into a BET sample holder.

The negative electrode may have a section loading level (L/L) of, for example, about 6 mg/cm$^2$ to about 65 mg/cm$^2$.

The carbon-based negative electrode active material may be an artificial graphite or a mixture of an artificial graphite and a natural graphite. When the negative electrode active material is a crystalline carbon-based material (such as the artificial graphite or the mixture of artificial graphite and natural graphite), alignment characteristics of a carbon material in an electrode plate with respect to an external magnetic field may be further improved. This is because crystallographic characteristics of particles are improved more than when an amorphous carbon-based active material is used.

The artificial graphite or the natural graphite may be an amorphous, sheet-type, flake-type, spherical, or fibrous natural graphite or artificial graphite, or a combination thereof. When the artificial graphite and the natural graphite are mixed and utilized, a mixing ratio may be, for example, in a range of about 70:30 wt % to about 95:5 wt %.

The negative electrode active mass may include at least one of an Si-based negative electrode active material, an Sn-based negative electrode active material, and a lithium vanadium oxide negative electrode active material. When the negative electrode active mass includes at least one of them (e.g., when the carbon-based negative electrode active material is the first negative electrode active material and the negative electrode active material is the second negative electrode active material), the mixing ratio of the first negative electrode active material and the second negative electrode active material may have, for example, a weight ratio of about 50:50 to about 99:1.

The Si-based negative electrode active material may be Si, $SiO_x$ ($0<x<2$), and a Si-Q alloy (Q is an alkali metal, an alkali earth metal, a group 13 element, a group 14 element, a group 15 element, a group 16 element, a transition metal, a rare earth element, or a combination thereof, and is not Si), the Sn-based negative electrode active material may be Sn, $SnO_2$, Sn-R (R is an alkali metal, an alkali earth metal, a group 13 element, a group 14 element, a group 15 element, a group 16 element, a transition metal, a rare earth element, or a combination thereof, and is not Sn), and at least one of them and SiO2 may be mixed. Examples of the elements Q and R include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combinations thereof.

In the negative electrode active material layer, the content of the negative electrode active material may be, for example, about 95 wt % to about 99 wt % of the entire weight of the negative electrode active material layer.

In an exemplary embodiment, the negative electrode active material layer may include a binder and, optionally, a conductive material. In the negative electrode active material layer, the content of the binder may be, for example, about 1 wt % to about 5 wt % of the negative electrode active material layer entire weight. When the conductive material is further included, the negative electrode active material may be included at about 90 wt % to about 98 wt %, the binder may be included at about 1 wt % to about 5 wt %, and the conductive material may be included at about 1 wt % to about 5 wt %.

The binder serves to bind negative electrode active material particles to each other, and to bind a negative electrode active material to a current collector. The binder may be a non-aqueous binder, an aqueous binder, or combinations thereof.

When the negative electrode binder is an aqueous binder, a cellulose-based compound may be further included as a thickener (e.g., for adjusting the viscosity). The conductive material gives conductivity to the electrode. Any suitable material that does not cause chemical change and corresponds to an electrically conductive material may be utilized in batteries.

The substrate may be at least one of a copper foil, a nickel foil, a stainless steel foil, a titanium foil, a nickel foam, a copper foam, a polymer substrate coated with a conductive metal, or a combination thereof.

FIGS. 1-4 illustrate stages of an embodiment of a method for manufacturing the negative electrode. The negative electrode may include graphite which is the aligned carbon-based active material.

As shown in FIG. 1, a first active mass including a negative electrode active material is disposed on one surface A of the substrate 300. For better understanding and ease of description, only first graphite materials 11 in the first active mass are exemplarily illustrated. The substrate 300 may be a thin metal plate type of current collector for the negative electrode of a rechargeable battery. In one embodiment, the thin metal plate may be a thing copper plate. The first graphite material may be artificial graphite, natural graphite, or a combination thereof.

The first graphite materials are aligned so that one axis thereof is inclined in the same direction using a magnetic field. Alignment of the first graphite materials 11 may be performed before the negative electrode active material is coated. Then, the active material layer is dried.

One axis X1 of the first graphite 11 may be a long axis (a first long axis) that is relatively longer than the other portions. The first long axis X1 is aligned to form a first acute angle θ1 with a first surface A of the substrate using a magnetic field.

The magnetic field may be generated by placing a permanent magnet 77 below a second surface B, which is the other surface of the substrate. When the permanent magnet is disposed below the second surface, magnetic flux from the magnetic field is formed in a direction perpendicular to the first surface A of the substrate. The distance between the permanent magnet 77 and the substrate 300 may be shorter, for example, than about 1 cm. The width of the permanent magnet 77 may correspond, for example, to the entire width of the substrate 300. The magnetic flux may be, for example, about 1,000 Gauss to about 10,000 Gauss. The time exposed to the magnetic flux may be, for example, in a range of about 1 second to about 30 seconds.

The negative electrode active material may be continuously coated on the substrate 300. The magnetic field may be at a predetermined angle with respect to the magnetic flux based on a vector function according to the speed at which the substrate 300 is transferred. Accordingly, the first long axis X1 of the first graphite 11 (which is a diamagnetic material) is inclined in an opposite direction to the magnetic field to form the first acute angle θ1 with the first surface A.

For example, when the direction in which the negative electrode active material is coated is assumed to be a first direction D1, the magnetic field is formed toward the first direction D1 and the first long axis X1 is inclined in an opposite direction of the first direction D1.

The substrate 300 may be continuously supplied, may form the first active mass, and may be wound to form a first roll R1.

Figure 2:
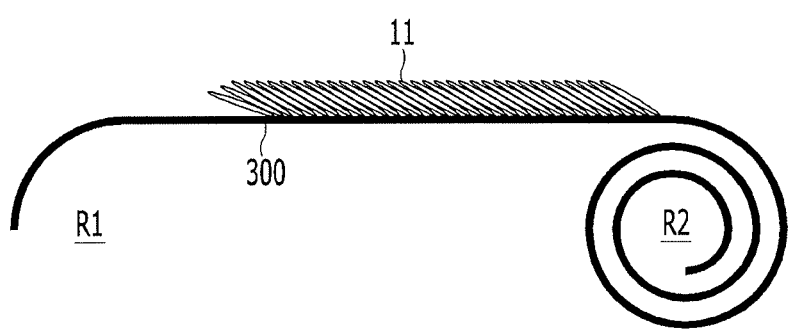

Then, as shown in FIG. 2. the first roll R1 is rewound to form a second roll R2. This process (which may be the same process used to form the first active mass) may be used for the second active mass on the other surface B of the substrate 300.

For example, when the second active mass is formed while the first roll R1 is not rewound but released, the second active mass is not formed from one end of the substrate, that is first inserted when the first active mass is formed, but from the other end of the substrate 300. Accordingly, when the first roll R1 is rewound to form the first active mass, the second active mass may be formed from the inserted one end.

Figure 3:
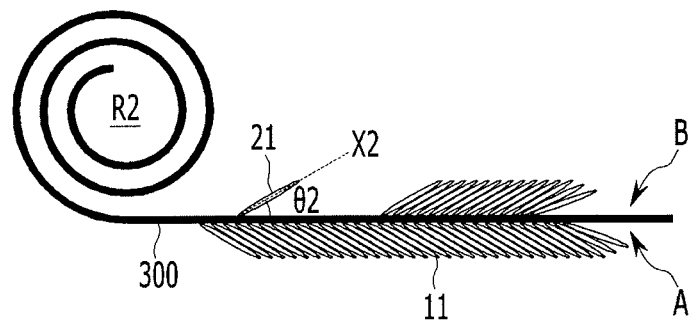

Next, as shown in FIG. 3, the second active mass is formed by releasing the second roll R2 and then coating negative electrode active material on the second surface B opposite to the first surface A of the substrate 300. The first active mass and the second active mass may be the same negative electrode active material. For better understanding and ease of description, only a second graphite 21 of the negative electrode active material layer is illustrated as an example.

The second roll R2 may be formed by rewinding the first roll R1. The negative electrode active material may be coated under the same process condition as that of the first active mass, when the second active mass is formed on the second surface B, while releasing the second roll R2.

Then, the second graphite materials 21 are aligned using a magnetic field, so that second long axes X2 of the second graphite materials 21 which are one axis of the second graphite material 21 are inclined in the same direction. The alignment of the second graphite materials 21 may be simultaneously performed with the coating of the negative electrode active material, and, for example, may be performed under the same conditions used to align the first graphite materials 11.

Accordingly, the second long axis X2 is aligned to be inclined in a direction facing the first long axis X1, with the substrate 300 therebetween. The second long axis X2 forms a second acute angle θ2 with the second surface B of the substrate 300. The sum of the first acute angle θ1 and the second acute angle θ2 may be, for example, less than about 180°. That is, the first long axis and the second long axis face each other based on the substrate to form an angle being less than about 180°, thus they may form a seagull shape or a V shape.

Figure 4:
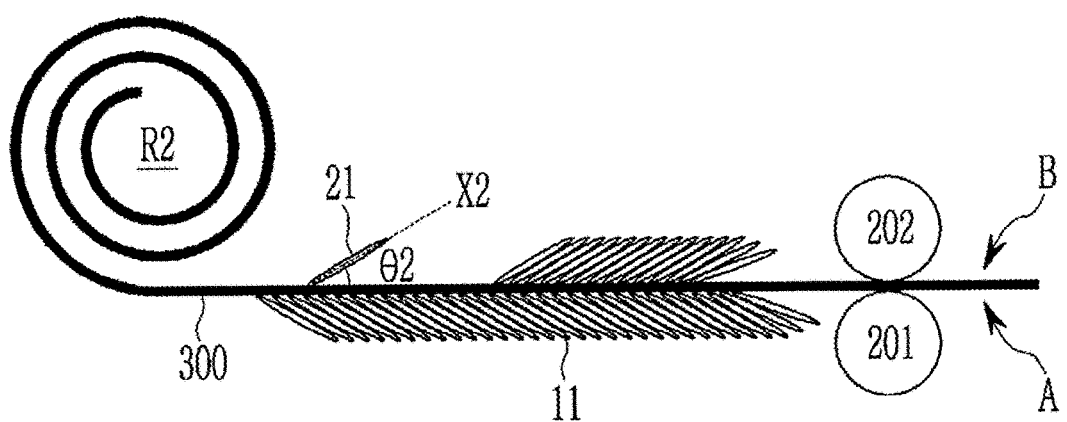

Next, as shown in FIG. 4, the first active mass and the second active mass are rolled. In the rolling process, the first active mass and the second active mass are simultaneously pressed by a first roller 201 positioned at the first surface A of the substrate 300 and a second roller 202 positioned at the second surface B. The first roller 201 and the second roller 202 rotate in opposite directions. Rotation of the first roller 201 and the second roller 202 causes a pressure to be applied to the first active mass and the second active mass. The second active mass is formed in the rolling process, and the rolling process may be continuously performed.

The first roller 201 is positioned on the first surface forming the first acute angle therewith. The second roller 202 is positioned on the second surface forming the second therewith. When the first roller 201 and the second roller 202 are positioned in directions respectively forming the acute angles with the first long axis X1 and the second long axis X2, after the rolling process, the first long axis forms a third acute angle greater than the first acute angle with the first surface A, and the second long axis X2 forms a fourth acute angle greater than the second acute angle with the second surface B.

In an exemplary embodiment, when the first active mass and the second active mass are formed, the graphite materials of the first active mass and the second active mass may be aligned to have a similar shape after they are rolled. This is because the first graphite materials and the second graphite materials are aligned with the same conditions. Thus, the first active mass and the second active mass may be uniformly formed without cracks. The first active mass and the second active mass according to the present embodiment may have a first degree of divergence (DD) and a second DD, respectively, as defined based on Equation 1. The first DD may be greater than, for example, about 60% of the second DD or the second DD may be greater than, for example, about 60% of the first DD.

$$DD = (I_a / I_{total}) \times 100 \quad (1)$$

where $I_a$ is a sum of peak intensities at non-planar angles when XRD is measured by using $CuK_\alpha$ rays, and $I_{total}$ is a sum of peak intensities at all angles when XRD is measured by using $CuK_\alpha$ rays.

In one exemplary embodiment, the rolling process may be performed in a direction opposite to a direction in which the first long axis and the second long axis form an acute angle. As a result, the DD of the first active mass positioned at an opposite side with respect to the substrate may be maintained to be equal to or greater than, for example, about 60% of the DD of the second active mass after the rolling process is performed.

In one embodiment, although the DD after the rolling process may decrease compared with the DD before the rolling process, the DD of the first active mass positioned with respect to the substrate is maintained to be equal to or greater than, for example, about 60% of the DD of the second active mass. This means that the graphite alignment of the first active mass and the second active mass positioned at opposite sides to each other based on the substrate is uniform. Because the graphite alignment of the first active mass and the second active mass is uniform, the electrochemical reaction in the first active mass and the second active mass may occur uniformly. As a result, the speed at which the negative electrode is degraded may be reduced.

Figure 5:
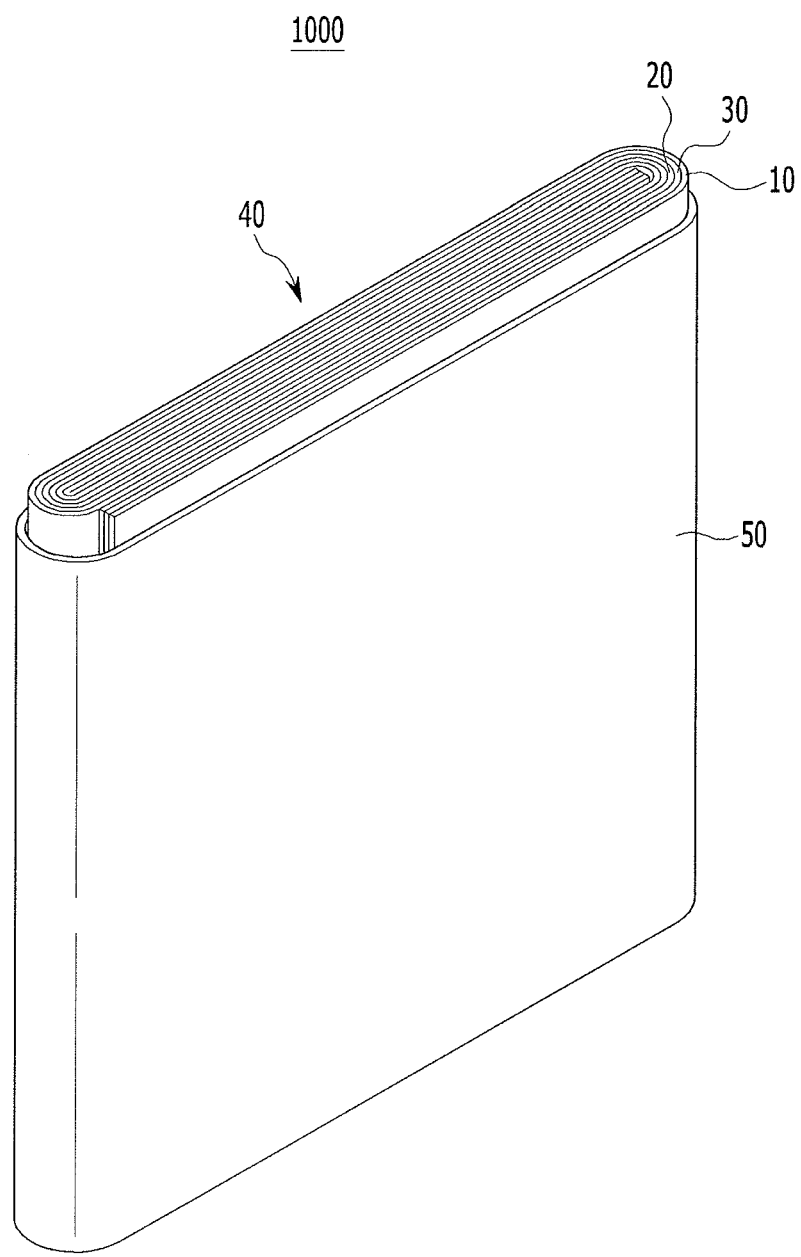
FIG. 5 illustrates an embodiment of a rechargeable battery.

FIG. 5 illustrates an exploded perspective view of an embodiment of a rechargeable battery 1000, which may have cylinder, a pouch, or another shape.

Referring to FIG. 5, the lithium rechargeable battery 1000 may include an electrode assembly 40 wound with a separator 30 between a positive electrode 10 and a negative electrode 20. A case 50 may accommodate the electrode assembly 40, and the positive electrode 10, the negative electrode 20, and the separator 30 may be impregnated in an electrolyte solution.

The negative electrode 20 may be the negative electrode manufactured, for example, by the manufacturing process of FIGS. 1-4. The respective long axes of the first graphite and the second graphite in each of the first active mass and the second active mass may be aligned to form an acute angle with a substrate.

The positive electrode 10 includes a positive electrode active material layer on a substrate. The positive electrode active material may be, for example, a compound (lithiated intercalation compound) capable of reversibly intercalating and deintercalating lithium ions. For example, the positive electrode active material may include one or more of cobalt, manganese, nickel, a metal selected from combinations thereof, and lithium. The content of positive electrode active material of the positive electrode may be, for example, about 90 wt % to about 98 wt % of the entire weight of the positive electrode active material layer.

In the exemplary embodiment, the positive electrode active material layer may include a binder and a conductive material. The content of each of the binder and the conductive material may independently be, for example, in the range of about 1 to about 5 wt % of the entire weight of the positive electrode active material layer. The binder serves to adhere the positive electrode active material particles to each other and adhere the positive electrode active material to the current collector.

Examples of the binder include polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber, acryl federated (e.g., copolymerized) styrene-butadiene rubber, epoxy resin, and nylon.

The conductive material provides conductivity to the electrode. Any conductive material may be used as the electrode conductive material as long as it does not cause an adverse chemical change.

The positive electrode substrate may be made of various metals. One example is aluminum.

The electrolyte includes a non-aqueous organic solvent and a lithium salt. The non-aqueous organic solvent serves as a medium which allows ions involved in an electrochemical reaction to move. The lithium salt is dissolved in the organic solvent and acts as a lithium ion supply source in the battery, thereby enabling a basic operation of a lithium secondary battery and promoting the movement of lithium ions between a positive electrode and a negative electrode.

Examples of lithium salt, as a supporting electrolyte salt, include one or more of $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2$, $C_yF_{2y+1}SO_2)$ (where x and y are natural numbers), LiCl, LiI, and $LiB(C_2O_4)_2$ (lithium bis(oxalato) borate: LiBOB). The concentration of the lithium salt may be in a range of, for example, about 0.1M to about 2.0M. When the concentration of the lithium salt is within the aforementioned range, the electrolyte has appropriate electrical conductivity and viscosity. As a result, performance of the electrolyte may become excellent and the lithium ions may move more effectively.

A separator may exist between the positive electrode and the negative electrode depending, for example, on the kind of the lithium rechargeable battery. Examples of the separator material include polyethylene, polypropylene, polyvinylidene fluoride, or a multilayer of two or more layers thereof may be utilized, or a mixed multilayer such as a polyethylene/polypropylene two layer separator, a polyethylene/polypropylene/polyethylene three layer separator, and a polypropylene/polyethylene/polypropylene three layer separator may also be utilized.

Exemplary Embodiment

In one exemplary embodiment, 97.5 wt % of artificial graphite, 1.5 wt % of styrene-butadiene rubber, and 1 wt % of carboxymethyl cellulose were mixed in a water solvent to manufacture a negative electrode active material slurry having a viscosity of about 2,300 cps at a temperature of about 25° C.

After positioning a Cu foil on a magnet generating a magnetic field of about 4,000 Gauss, the negative electrode active material slurry was coated on the Cu foil, exposed in a magnetic field for 9 seconds, dried, and then pressed to have an active mass density of about 1.60 g/cc to manufacture a negative electrode having a cross-sectional loading level (L/L) of about 12 mg/cm$^2$.

96 wt % of a $LiCoO_2$ positive electrodeactive material, 2 wt % of a carbon black conductive agent, and 2 wt % of a poly vinylidene fluoride binder were mixed in an N-methylpyrrolidone solvent to manufacture a positive electrode active material slurry. The manufactured slurry was coated on an Al substrate and then dried and pressed to manufacture a positive electrode.

A full cell having a capacity of about 550 mAh and a current density of about 4.16 mAh/cm$^2$ was manufactured with the negative electrode, the positive electrode, and electrolyte. A mixed solvent of ethylene carbonate and diethyl carbonate (volume ratio of 50:50), in which about 1 M of $LiPF_6$ is dissolved, was used as an electrolyte.

The negative electrode active material slurry was fixedly coated as in FIG. 1 to FIG. 4 described above, aligned by using a magnetic field, and then pressed.

Comparative Example

In a comparative example, a negative electrode was manufactured by the same process as the exemplary embodiment, except that alignment using a magnetic field was not performed and a lithium rechargeable battery was manufactured with the negative electrode.

* Characteristic Evaluation of Rate

Figure 6:
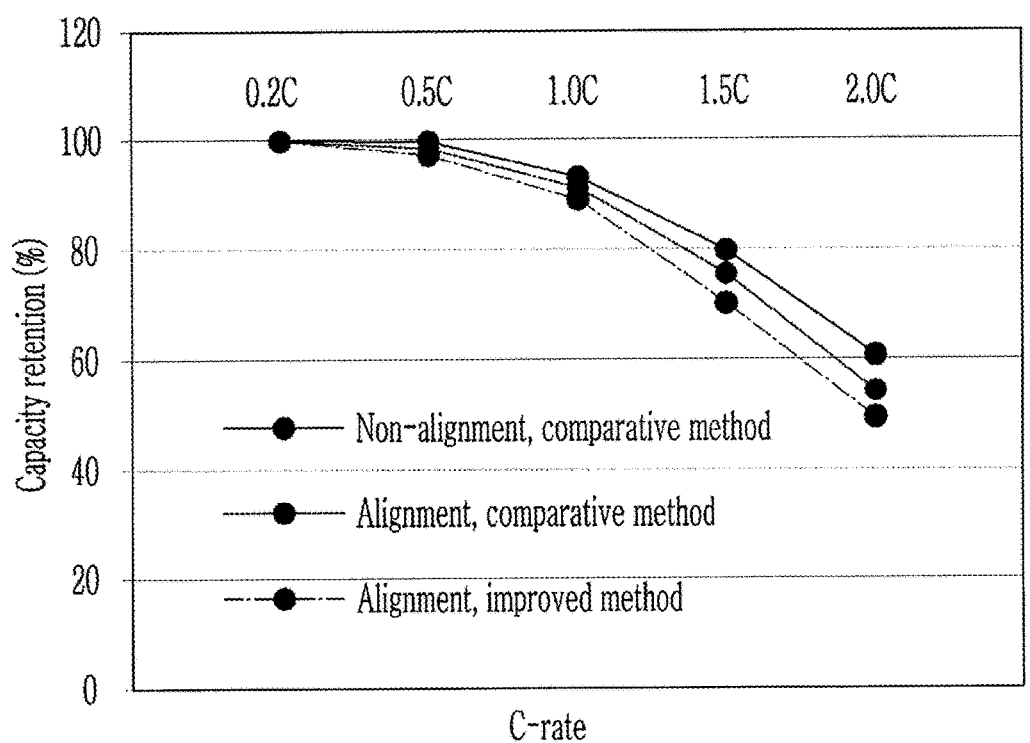
FIG. 6 illustrates an example of charge capacity measured by charging or discharging rechargeable batteries.

Half-cells according to the exemplary embodiment and the comparative example were respectively charged and discharged one time with 0.2 C, 0.5 C, 1 C, 1.5 C, and 2 C at a C-rate, and capacity ratios at the respective C-rates with respect to a discharging capacity of 0.2 C were calculated. FIG. 6 illustrates the calculated results, which show that the capacity retentions of the negative electrode of the exemplary embodiment are more excellent than those of the comparative example at all of the C-rates.

* Evaluation of Lithium Deposition

Figure 7:
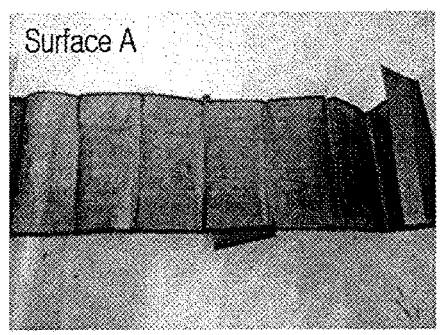
FIG. 7 illustrates photographs of examples of surfaces of negative electrodes obtained by fully charging rechargeable batteries respectively manufactured according to an example and a comparative example.
Figure 7:
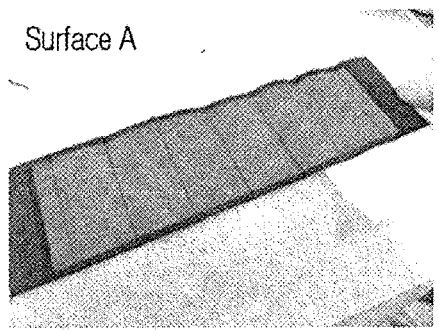
Figure 7:
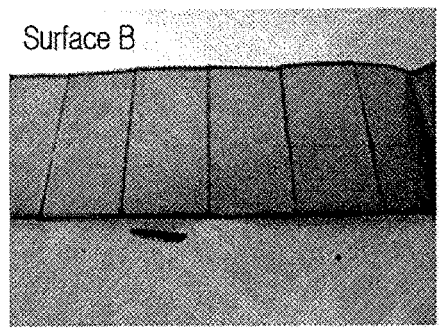
Figure 7:
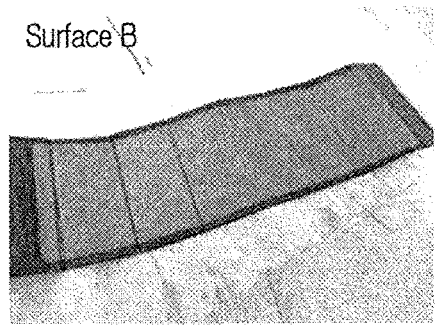

The lithium rechargeable batteries according to the exemplary embodiment and the comparative example were fullcharged with 0.7 C, and then dismantled for the negative electrode to be disassembled. Lithium deposition with respect to the negative electrode surface was confirmed. FIG. 7 illustrates the results, which show that lithium was deposited on a first surface A and a second surface B of the substrate in the case of the comparative example, while lithium was not deposited on both the surface A and the surface B in the case of the exemplary embodiment.

The lithium was not deposited in the sense that, when lithium ions were inserted into the negative electrode, resistance against them was small, e.g., below a predetermined value. Because the resistance of the negative electrode is decreased as a result of the alignment, deposition of the lithium is suppressed. When deposition of the lithium is suppressed, it is possible to improve stability of a cell or a rechargeable battery and to suppress depletion of an electrolyte solution due to the continuous decomposition of the electrolyte solution, thereby improving electrochemical characteristics of a cell or a battery such as a lifespan thereof.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A method for manufacturing a negative electrode of a rechargeable battery, the method comprising:
coating a first active mass on a first surface of a substrate, the first active mass including a first graphite material;
aligning the first graphite material based on a first magnetic field so that a first long axis of the first graphite material forms a first acute angle with the first surface;
coating a second active mass on a second surface of the substrate positioned at an opposite side of the first surface, the second active mass including a second graphite material;
aligning the second graphite material based on a second magnetic field so that a second long axis of the second graphite material forms a second acute angle with the second surface; and
pressing the first graphite and the second graphite using a roller, wherein aligning the second magnetic field includes aligning the second long axis to be inclined in a direction facing the first long axis with the substrate therebetween.

2. The method as claimed in claim 1, wherein a sum of the first acute angle and the second acute angle is less than about 180°.

3. The method as claimed in claim 1, wherein:
the roller includes a first roller positioned on the first surface and a second roller positioned on the second surface, and
the method includes rotating the first roller and the second roller in directions facing each other.

4. The method as claimed in claim 3, wherein:
the first roller is positioned on the first surface forming the first acute angle, and
the second roller is positioned on the second surface forming the second acute angle.

5. The method as claimed in claim 1, wherein after the pressing:
the first long axis forms a third acute angle greater than the first acute angle with the first surface, and
the second long axis forms a fourth acute angle greater than the second acute angle with the second surface.

6. The method as claimed in claim 1, further comprising after the aligning based on the first magnetic field:
forming a first roll by winding the substrate, and
forming a second roll by rewinding the first roll.

7. A negative electrode of a rechargeable battery, comprising:
a substrate;
a first active mass on a first surface of the substrate and including a first graphite material; and
a second active mass on a second surface of the substrate and including a second graphite material, wherein each of the first active mass and the second active mass has a degree of divergence (DD) defined by Equation 1 and wherein the DD of the first active mass is equal to or greater than about 60% of that of the second active mass $$DD=(I_a/I_{total}) \times 100 \qquad (1)$$

where $I_a$ is a sum of peak intensities at non-planar angles when XRD is measured by using CuK$_\alpha$ rays, and $I_{total}$ is a sum of peak intensities at all angles when XRD is measured by using CuK$_\alpha$ rays.

8. The negative electrode as claimed in claim 7, wherein the first active mass includes an artificial graphite material or a mixture of an artificial graphite material and a natural graphite material.

9. The negative electrode as claimed in claim 7, wherein:
a first long axis of the first graphite material is at a first acute angle relative to the first surface, and
a second long axis of the second graphite material is at a second acute angle relative to the second surface.

10. The negative electrode as claimed in claim 9, wherein a sum of the first acute angle and the second acute angle is less than about 180°.

11. The negative electrode of the rechargeable battery of claim 10, wherein the first long axis and the second long axis face each other based on the substrate to form a seagull shape or a V shape.

12. The negative electrode of the rechargeable battery of claim 7, wherein the DD of each of the first active material and the second active material is 19 to 60.

13. A negative electrode of a rechargeable battery, comprising:
a first active mass; and
a second active mass,
wherein the first active mass and the second active mass are on different sides of a substrate and wherein the first active mass has a first degree of divergence and the second active mass has a second degree of divergence greater than the first degree of divergence.

14. The negative electrode as claimed in claim 13, wherein the degree of divergence of each of the first active mass and the second active mass is based on Equation 1:

$$DD=(I_a/I_{total}) \times 100 \qquad (1)$$

where $I_a$ is a sum of peak intensities at non-planar angles when XRD is measured by using CuK$_\alpha$ rays, and $I_{total}$ is a sum of peak intensities at all angles when XRD is measured by using CuK$_\alpha$ rays.

15. The negative electrode as claimed in claim 13, wherein the first degree of divergence is equal to or greater than about 60% of the second degree of divergence.

16. The negative electrode as claimed in claim 13, wherein graphite materials in the first active mass and the second active mass, respectively, are aligned under a same condition.

17. The negative electrode as claimed in claim 13, wherein a rolled state of the first active mass and a rolled state of the second active mass have a same shape.

18. The negative electrode as claimed in claim 13, wherein:
the first active mass includes a first graphite material, and
the second active mass includes a second graphite material.

19. The negative electrode as claimed in claim 18, wherein the first graphite material is an artificial graphite material or a mixture of an artificial graphite material and a natural graphite material.

20. The negative electrode as claimed in claim 18, wherein:
a first long axis of the first graphite material is at a first acute angle relative to a first side of the substrate, and
a second long axis of the second graphite material is at a second acute angle relative to a second side of the substrate.

* * * * *